Nov. 12, 1968  L. E. FECHTER  3,410,412

SLUDGE SCRAPER MECHANISM

Filed Dec. 23, 1966  3 Sheets-Sheet 1

LEONHARD EMIL FECHTER
INVENTOR.

BY Alan J. Steger

Agent

Nov. 12, 1968  L. E. FECHTER  3,410,412
SLUDGE SCRAPER MECHANISM

Filed Dec. 23, 1966  3 Sheets-Sheet 2

LEONHARD EMIL FECHTER
INVENTOR.

BY Alan J. Steger
Agent

Nov. 12, 1968   L. E. FECHTER   3,410,412
SLUDGE SCRAPER MECHANISM
Filed Dec. 23, 1966   3 Sheets-Sheet 3

INVENTOR.
LEONHARD ENIL FECHTER
BY
Alen J. Stegen

3,410,412
SLUDGE SCRAPER MECHANISM
Leonhard Emil Fechter, Michelbach, Germany, assignor to Passavant-Werke (near Michelbach, Nassau), Germany, a corporation of Germany
Filed Dec. 23, 1966, Ser. No. 604,477
Claims priority, application Germany, Dec. 23, 1965,
P 38,422
13 Claims. (Cl. 210—143)

ABSTRACT OF THE DISCLOSURE

A drive motor powers an arm mechanism which positions and loads a sludge scraper blade in a sludge tank, and is capable of automatically repositioning the blade if it drops or is raised up by variations in the sludge level in the tank.

Background of the invention

The present invention relates to a scraper blade loading mechanism, and, more particularly to a blade loading linkage for use on a traveling bridge, as used in the waste water treatment industry, to scrape sludge as it collects in a sedimentation tank or basin.

Prior sludge scrapers commonly incorporated one or both of two methods to load the scraper blade against the forces produced by the sludge's resistance. These methods are spring loading and weighted lever loading.

A sludge scraper utilizing a weighted lever to load the scraper blade is shown in German Patent No. 1,179,160. One of the primary disadvantages of mechanisms of this type is that the scraping force of the blade against the sludge deposits is largely limited by the weight of the weighted lever arm. Sludges of unusually high density required more passes of the scraper bridge in order to be collected, if they could be removed at all, because the scraper blade would rise over the top of the accumulated sludge instead of driving through it.

A companion problem relates to the motor used to lift the scraper blade out of the tank. Lifting was frequently done, as in German Patent 1,179,160, by using the motor to wind up a cable attached to the scraper end of the support arm. Heavier loading weights required larger motors or lower gearing. In addition, the motor was only needed, and used, to move the scraper blade in and out of the tank.

In spring loaded mechanisms, such as disclosed in British Patent 364,538, springs are used to supply force instead of weights on lever arms. Mechanism of this type have much the same limitation in overcoming the resistance of accumulated sludge as the weighted lever arm mechanism described above.

Summary of the invention

The problems associated with maintaining scraper blade loading through heavy sludge have been obviated with this invention. In addition, a more efficient use is made of the drive motor whereby it positions and helps load the scraper blade into the tank as well as serving to retract the blade as desired.

A weight, in combination with the drive motor, serves to load and position the scraper blade either into the accumulated sludge deposits, or on the bottom of the tank, depending on the sludge's consistency. The motor then repositions the linkage mechanism so that the main driving force on the scraper blade is supplied through rigid linkages acting on the bridge in reaction to the sludge load acting on the scraper blade.

When retracting the scraper blade from the tank, the drive motor has only to overcome the weight of the linkage arms, scraper blade and, maybe, a small amount of sludge; no forces from loading weights on springs have to be overcome, so the rating of the motor required can be reduced proportionally.

A feature of the invention is the provision of a mechanism which retracts the scraper blade from the tank bottom without having to overcome the loading means, such as a spring or counterweight, on the scraper blade.

Another feature of the invention is the provision of a mechanism which allows a substantially uniform high loading force on the blade which is not a function of the angle that the blade mounted support arms are positioned with respect to the tank bottom.

Still another feature of the invention is the provision of a mechanism which utilizes the drive motor for the dual purpose of loading the blade in the desired operating position and retracting it from the tank bottom.

Still another feature of the invention is the provision of a mechanism which loads the scraper blade firmly without any special locking devices so that it is quickly adjustable.

It is, therefore, an object of this invention to provide an improved sludge scraper wherein the scraper blade will remain in a loaded position regardless of variations in the force on the scraper blade, and in the level of the sludge on the tank's bottom as the blade moves across the tank.

Another object of this invention is to provide an improved economical sludge scraper loading mechanism wherein the weight of the blade retracting means is applied to the blade in loaded position and is completely removed from the weight to be overcome in retracting the scraper blade from the tank.

Another object of this invention is to provide a sludge scraper loading mechanism which continuously works to adjust the scraper blade so that it is positioned within predetermined limits of the sludge tank's bottom.

Description of the preferred embodiments

Figure 1:
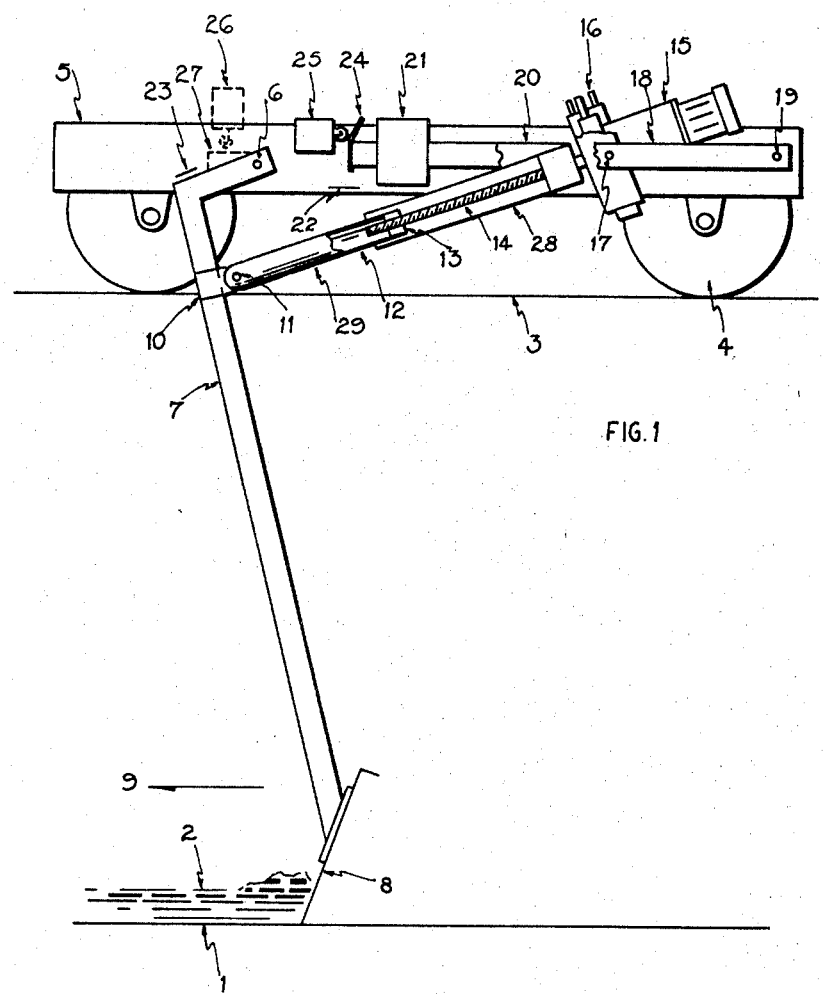
FIGURE 1 is a side elevational view of one embodiment of the scraper mechanism with part of the apparatus broken away.

In FIGURE 1, the bottom 1 and the top rim 3 of an elongated sludge tank, or basin, is shown. Mounted on rim 3 with wheels 4 is a bridge 5 which is adapted for reciprocal movement along the top of rim 3. Mounted on bridge 5 about pivot pin 6 is a support arm 7 on which scraper blade 8 is attached so as to be capable of resting on either the tank bottom 1 or sludge accumulations 2.

Firmly attached to support arm 7 is a bracket 10 on which the lower end of load arm 12 is pivotally mounted at pin 11. Load arm 12 comprises two cylindrical sections joined end to end. On the non-pivoted end of the lower section of arm 12, a spindle nut 13 is mounted to receive worm screw 14. The other end of worm screw 14 extends out the top end of section 28 of load arm 12 and is connected to drive motor 15. Worm screw 14 is completely encased by section 28 of load arm 12, and, when extended into the lower end of lever arm 12, it is lubricated by lubricant 29 so it is always protected from corrosion and foreign substances.

Drive motor 15 is mounted on a universal joint 16 which in turn is pivotally mounted on swing lever arm 18 with bearings 17. The universal joint 16 is provided to eliminate the transfer of any bending moments from scraper blade 8 to swing lever arm 18.

Swing lever arm 18, which straddles drive motor 15, is pivotally mounted on one end on bridge 5 with pin 19. When the scraper blade 8 is in normal operating position in the sludge deposits 2 or on tank bottom 1, swing lever arm 18 is positioned substantially horizontally by load lever arm 12 acting through bearings 17. The other end of swing lever arm 18, comprising parts 20, is positioned between stop 22 on the underside and limit switch 25 on the topside, both of which are mounted on bridge 5. A switch stop 24 is mounted on the end of part 20 of swing lever arm 18 so as to contact limit switch 25 when swing lever arm 18 rotates up from the horizontal plane. Another stop 23 is positioned to contact support arm 7 and limit the downward swing of support arm 7 so as to define the lowermost position of scraper blade 8.

It can be seen that, with load lever arm 12 positioned at a slight angle to the horizontal, the load applied to support arm 7 induces a substantially vertical load on scraper blade 8 so that lifting pressures are resisted to a great extent.

In operation, two bridge 5 units, as shown in FIGURE 1, operate together in parallel with one on each side of a rectangular sludge tank. The scraper blade 8 is then supported and guided by two support arms 7, one mounted on each bridge 5. As the bridges reciprocate on the rim 3 of the sludge tank, the sludge is scraped and impelled in direction 9 toward a collection pit (not shown) on one side of the tank.

To begin operation, support arms 7 drop scraper blade 8 into the tank until the blade 8 stops either against the accumulated sludge 2 or the bottom 1. Drive motor 15 is started and worm screw 14 extends load arm 12 which swings swing lever arm 18 up to the horizontal plane. At this point, switch stop 24 opens limit switch 25 which stops drive motor 15. Weight 21 is slidably mounted on parts 20, of swing lever arm 18 to load blade 8. The weight of drive motor 15 also serves to load blade 8. With swing lever arm 18 in the horizontal position, the optimum power is translated by arms 7, 12 and 18 through pivot points 11, 17 and 19 to scraper blade 8.

In the event that scraper blade originally contacted sludge 2 instead of bottom 1, the scraper blade 8 may drop lower as the bridge proceeds in direction 9. This reaction would cause swing lever arm 18 to rotate downward and limit switch would start drive motor 15 to turn worm screw 14 to extend load arm 12 to return swing lever arm 18 to the horizontal position whereupon switch stop opens limit switch 25 to deactivate drive motor 15.

The switch stop 24 is so designed that when the scraper blade 8 is lifted up by greater scraping resistance or obstructions, it will again activate motor 15 to turn worm screw 14 into load arm 12 to lower swing arm 18 back to the horizontal plane.

An alternative construction is to replace stop 22 with a limit switch such as switch 25. Then, when the scraper blade 8 is dropped lower, switch 22 could activate drive motor 15 to lift swing lever arm 18 back to the horizontal. If scraper blade 8 lifted up, limit switch 25 would activate drive motor 15 to lower worm screw 14 into load arm 12 so that swing lever arm 18 returned down to a horizontal position.

If the sludge to be handled is of the low resistance type, such as communal sewage, still another limit switch system can be used because the scraper blade 8 would not then be expected to rise off the tank bottom 1. In place of a limit switch 25 or 22, a stop 27 would be placed on support arm 7. A limit switch 26 is then mounted on bridge 5 to activate drive motor 15 to turn worm screw 14 which extends load arm 12 to position scraper blade 8 into its lowermost position. At that point, stop 27 contacts and opens limit switch 26 to deactivate drive motor 15.

In the usual configuration, using limit switch 25, stop 23 defines the absolute limit as to the depth that scraper blade 8 can be lowered into the tank. However, stop 22 determines the lower depth limit of scraper blade 8 when worm screw 14 is extended from load arm 12 at any length but its fully extended position.

Figure 2:
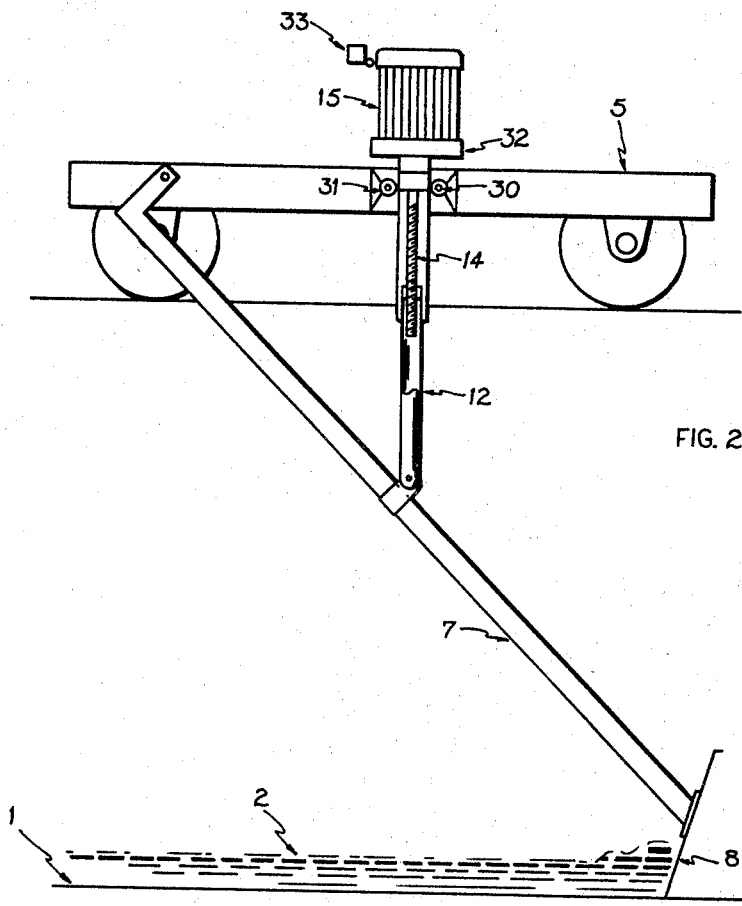
FIGURE 2 is a side elevational view of another embodiment of the scraper mechanism with part of the mechanism shown broken away.
Figure 3:
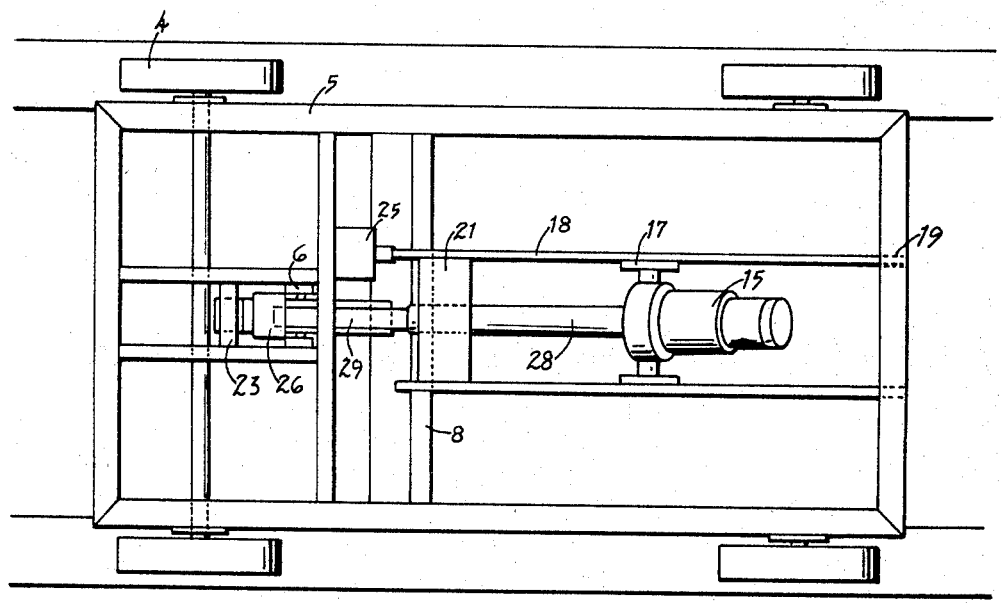
FIGURE 3 is a top view of the sludge scraper mechanism shown in FIGURE 1.
Figure 4:
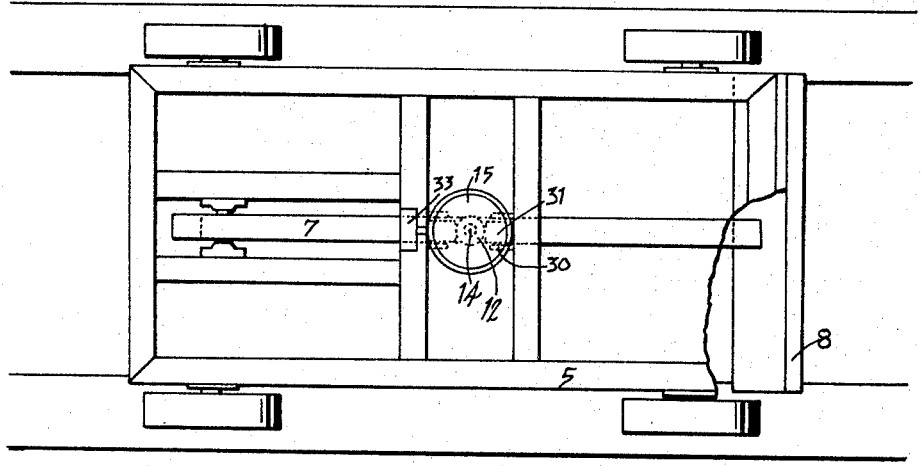
FIGURE 4 is a top view of the sludge scraper mechanism shown in FIGURE 2.

In FIGURE 2, another embodiment is shown. Support arm 7 is pivotally mounted onto bridge 5 in the same manner as described above for FIGURE 1. Scraper blade 8 and the one end of load arm 12 are also attached to support arm 7 in the same manner as described for corresponding parts in FIGURE 1. Load arm 12 is positioned vertically upward from support arm 7. Worm screw 14 extends from load arm 12 up past the side of bridge 5. Guide rollers 30, 31 are mounted on bridge 5 to contact, support and guide the upper end of load arm 12.

Drive motor 15 is mounted on the end of worm screw 14 and is supported thereby above bridge 5 to provide the weight to load scraper blade 8. The bottom 32 of drive motor 15 serves as a stop 32 to limit the lowermost penetration of scraper blade 8 into the tank for a given extension of worm screw 14 out of load arm 12.

In operation, drive motor 15 turns worm screw 14 to lower support arm 7 and loads scraper blade 8 against the sludge 2 or tank bottom 1. A limit switch 33 is mounted on bridge 5 to contact and deactivate the drive motor 15 when it has pushed itself a predetermined distance above bridge 5. As in the apparatus described above in FIGURE 1, two bridges 5 are generally used together, one on each side of the tank to support scraper blade 8 on each side.

An alternate arrangement would place the limit switch 33 to contact the drive motor bottom 32 when it came near bridge 5. The limit switch 33 would then keep drive motor 15 operating to push scraper blade downward until the resistance made drive motor 15 push itself far enough up off bridge 5 to open limit switch 33 to deactivate drive motor 15. The drive motor 15 is, therefore, always lifted slightly above bridge 5.

Thus it will be seen that an improved sludge scraper mechanism has been provided which achieves the objectives and advantages set forth and overcomes the disadvantages associated with prior such systems thereby obtaining a result heretofore unobtainable.

The drawings and specification present a detailed disclosure of the preferred embodiments mentioned, and it is to be understood that the invention is not limited to the specific form disclosed, but covers all modifications, changes and alternative constructions and methods falling within the scope of the principles taught by the inventor.

I claim:

1. Sludge scraper apparatus mounted on a bridge which is powered and disposed to travel along the top rim of a sludge basin, having a bottom, side walls extending from the bottom to the top rim and a sludge collection pit on one side, said sludge scraper apparatus comprising, in combination;

a support arm pivotally mounted on said bridge and extending into said sludge basin;

a scraper blade mounted on said support arm capable of being positioned on the bottom of said basin by said support arm;

a swing lever arm, having pivoted and non-pivoted ends, pivotally connected at one end thereof to said bridge;

a loading arm pivotably connected on one end to said support arm and on the other end to said swing lever arm;

extensible means mounted on, and forming part of, said loading arm, intermediate the ends thereof;

drive motor means operably engaging said extensible means whereby said extensible means adjusts the length of said loading arm upon activation of said drive motor means.

2. Apparatus as set forth in claim 1, wherein;

said extensible means comprises a worm screw threaded into one end of said loading arm with a spindle nut so that the axes of said worm screw and loading arm are substantially coincident.

3. Apparatus as set forth in claim 2, wherein said drive motor is pivotally mounted to said swing lever arm, and operably connected to said worm screw to rotate it and thereby change the effective length of said loading arm.

4. Apparatus as set forth in claim 3, further including;

a limit switch mounted on said bridge and positioned to release its contact with the non-pivoted end of said swing lever arm when said swing lever arm is caused to rotate downward from its position in the horizontal plane as the scraper blade drops lower into the sludge in the bottom of said basin;

and said limit switch is operatively connected to said drive motor to activate it to rotate said worm screw to change the effective length of said loading arm so that said swing lever is repositioned to the horizontal plane and comes back into contact with said limit switch to cause said limit switch to stop activating said motor.

5. Apparatus as set forth in claim 3, further including;

a limit switch mounted on said bridge and positioned in spaced relationship to said support arm, and operatively connected to said drive motor to cause said drive motor to rotate said worm screw to extend said loading arm about its pivot point to extend said scraper blade to its deepest position within said sludge basin whereupon the space between said limit switch and said support arm is closed and said limit switch is deactivated to stop said drive motor.

6. Apparatus as set forth in claim 3, further including;

a weight slidably mounted on the non-pivoted end of said swing lever arm to load said swing lever arm when said scraper blade is under pressure in operating position.

7. Sludge scraper apparatus mounted on a bridge which is powered and disposed to travel along the top rim of a sludge basin, having a bottom, side walls extending from the bottom, said sludge scraper apparatus comprising, in combination;

a support arm pivotally mounted on said bridge, and extending downward into said basin;

a scraper blade mounted on one end of said support arm;

a first stop means mounted on said bridge to arrest the rotation of said support arm so as to define the lowermost position of said scraper blade relative to the bottom of said basin;

a swing lever arm pivotally mounted on one end to said bridge, with the non-pivoted end of said swing lever arm being free to rotate about the pivoted end;

a loading arm having one end pivotally connected to said support arm at a point between the pivoted and scraper blade ends of said support arm, said loading arm including a spindle nut and a worm screw mounted therethrough so as to be capable of extending itself in and out of the loading arm;

a drive motor operatively connected to said worm screw and pivotally mounted with a universal joint to said swing lever arm intermediate its ends, thereby linking said support arm with said swing lever arm, and being capable of turning said worm screw to extend the length of said loading arm to turn said swing lever arm about its pivoted end;

a weight slidably mounted on the non-pivoted end of said swing lever arm;

a second stop mounted below the non-pivoted end of said swing lever arm, and positioned to arrest the downward movement of said swing lever arm to define the lowermost position of said scraper blade according to the degree said worm screw is extended from said loading arm;

and a limit switch mounted on said bridge in spaced relationship to the non-pivoted end of said swing lever arm, and operatively connected to said drive motor to activate said motor to rotate said worm screw to extend said loading arm to lift said swing lever arm up to the horizontal plane, thereby closing said limit switch and deactivating said motor.

8. Sludge scraper apparatus mounted on a bridge which is powered and disposed to travel along the top rim of a sludge basin, having a bottom, side walls extending from the bottom to the top rim and a sludge collection pit on one side, said sludge scraper apparatus comprising, in combination;

a support arm pivotally mounted on said bridge and extending into said sludge basin;

a scraper blade mounted on said support arm capable of being positioned on the bottom of said sludge basin by said support arm;

a loading arm pivotally connected on one end to said support arm with the other end supported on said bridge;

extensible means mounted on, and forming part of, said loading arm, intermediate the ends thereof;

drive motor means bearing on said loading arm and operably engaging said extensible means whereby said extensible means adjusts the length of said loading arm upon activation of said drive motor means.

9. Apparatus as set forth in claim 8, wherein;

said loading arm is mounted substantially vertically on said support arm.

10. Apparatus as set forth in claim 9, wherein said drive means adjusts the length of said loading arm in response to changes in the depth of said scraper blade in said sludge basin and guide means mounted on said bridge to guide the movement of said lever arm as its length is varied by said drive means.

11. Apparatus as set forth in claim 10, wherein;

said extensible means comprises a worm screw mounted on one end of said lever arm with a spindle nut to extend coaxially with said lever arm;

and said drive motor means is operably connected to the other end of said worm screw and said motor extends above said bridge and is supported by said lever arm.

12. Apparatus as set forth in claim 11, further including;

a limit switch mounted on said bridge, and spaced from and operatively connected to, said drive motor to activate it to raise said lever arm up against the scraper blade resistance until said drive motor contacts and opens said limit switch to deactivate said drive motor;

and stop means mounted on said bridge to limit the downward movement of said drive motor.

13. Apparatus as set forth in claim 11, further including;

a stop means mounted on said bridge to limit the downward movement of said drive motor, said stop means including a switch which causes said drive motor to operate and extend the length of said lever arm until said drive motor is raised above said bridge, thereby opening said switch which deactivates said drive motor.

References Cited

UNITED STATES PATENTS

| | | | |
|---|---|---|---|
| 2,033,291 | 3/1936 | Laughlin et al. | 210—527 |
| 2,101,079 | 12/1937 | Lund | 210—527 |
| 2,006,825 | 7/1935 | Downes | 210—527 X |
| 2,101,080 | 12/1937 | Lund | 210—527 X |

FOREIGN PATENTS

| | | |
|---|---|---|
| 333,625 | 2/1921 | Germany. |
| 510,264 | 7/1939 | Great Britain. |
| 733,825 | 7/1955 | Great Britain. |

REUBEN FRIEDMAN, *Primary Examiner.*

J. L. DE CESARE, *Assistant Examiner.*